(12) United States Patent
Siu et al.

(10) Patent No.: US 9,747,079 B2
(45) Date of Patent: Aug. 29, 2017

(54) METHOD AND SYSTEM OF SOFTWARE SPECIFICATION MODELING

(71) Applicant: General Electric Company, Schenectady, NY (US)

(72) Inventors: Kit Yan Siu, Niskayuna, NY (US); Andrew Walter Crapo, Niskayuna, NY (US); Michael Richard Durling, Niskayuna, NY (US); Luca Parolini, Garching b.Munchen (DE); Panagiotis Manolios, Sharon, MA (US); Han Yu, Niskayuna, NY (US); Scott Stacey, Dayton, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/570,513

(22) Filed: Dec. 15, 2014

(65) Prior Publication Data
US 2016/0170714 A1  Jun. 16, 2016

(51) Int. Cl.
*G06F 9/44* (2006.01)
*G06Q 10/06* (2012.01)

(52) U.S. Cl.
CPC .................. *G06F 8/20* (2013.01); *G06F 8/10* (2013.01); *G06Q 10/06* (2013.01)

(58) Field of Classification Search
USPC ................................................. 717/104, 105
See application file for complete search history.

(56) References Cited

U.S. PATENT DOCUMENTS

| 6,681,383 B1* | 1/2004 | Pastor ....................... G06F 8/30 717/126 |
| 7,424,701 B2* | 9/2008 | Kendall ................. G06N 5/027 706/46 |

(Continued)

FOREIGN PATENT DOCUMENTS

WO          00/42529 A1        7/2000

OTHER PUBLICATIONS

"Insfran-Req enf based modeling—2002", Insfran, "Requirements Engineering-Based Conceptual Modeling", Springer Link, Requirements Engineering, Jun. 2002.*

(Continued)

*Primary Examiner* — Wei Zhen
*Assistant Examiner* — Hossain Morshed
(74) *Attorney, Agent, or Firm* — Nitin N. Joshi

(57) ABSTRACT

According to some embodiments, a system includes a communication device operative to communicate with a user to obtain the one or more requirements associated with a specification model for a semantic module; a semantic module to receive the one or more requirements, store the one or more requirements and transform the one or more requirements into a semantic model; a specification module to receive the semantic model, store the semantic model, translate the semantic model and generate a specification model; a memory for storing program instructions; at least one specification model platform processor, coupled to the memory, and in communication with the specification module and the semantic module and operative to execute program instructions to: transform the one or more requirements into a semantic model by executing the semantic module; translate the semantic model into a graphical model by executing the specification module; and modify the graphical model by executing the specification module to (Continued)

generate the specification model; and generate a specification model that is human-readable and computer-readable for use in software design. Numerous other aspects are provided.

23 Claims, 12 Drawing Sheets

(56) References Cited

U.S. PATENT DOCUMENTS

| | | | |
|---|---|---|---|
| 7,644,334 B2 | 1/2010 | Hickman et al. | |
| 7,865,339 B2 | 1/2011 | Rushby et al. | |
| 8,365,138 B2 | 1/2013 | Iborra et al. | |
| 8,443,337 B2 | 5/2013 | Chou et al. | |
| 8,549,469 B2* | 10/2013 | Bolarinwa | G06F 9/4443 717/105 |
| 2002/0062475 A1* | 5/2002 | Iborra | G06F 8/30 717/108 |
| 2005/0204334 A1* | 9/2005 | Parthasarathy | G06F 8/10 717/107 |
| 2006/0230034 A1* | 10/2006 | Balmelli | G06Q 10/10 |
| 2011/0041116 A1* | 2/2011 | Sampath | G06F 8/10 717/101 |
| 2011/0083124 A1* | 4/2011 | Moskal | G06F 8/43 717/126 |
| 2011/0167409 A1* | 7/2011 | Schadow | G06F 8/20 717/123 |
| 2014/0188917 A1* | 7/2014 | Hopkins | G06F 17/30734 707/756 |
| 2016/0170864 A1* | 6/2016 | Li | G06F 11/3684 717/126 |

OTHER PUBLICATIONS

Saeki-NPL-Semantic Requirments Engineering—2010, Saeki, "Semantic Requirements Engineering", Intentional Perspectives on Information Systems Engineering, Spinger Link, May 2010.*
OASIS-Open-Satndards—Jun. 2014, Located at https://www.oasis-open.org/committees/tc_home.php?wg_abbrev=xacml.*
Hanson-Machine Learning, Hanson, "machine Learning: from Theory to applications", 2015.*
Motik, A Conceptual Modeling Approach for Semantics-Driven Enterprise Applications, 2002, Conference paper, vol. 2519 of the book series Lecture Notes in Computer Science (LNCS).*
Lee, John et al., "Requirements Modeling and Automated Requirements-Based Test Generation", SAE International, 2013, (pp. 1-9, 9 total pages).
Safar, K. et al., "Autonomous Semantic Data Modeling Tool using Computational Linguistics", MAGNT Research Report, vol. 2, Issue 3, [no date], ISSN: 1444-8939, (pp. 8-14, 7 total pages).
Miller et al., "Proving the Shalls", International Journal on Software Tools for Technology Transfer, pp. 303-319, Feb. 17, 2006.
Ilic, "Deriving Formal Specifications from Informal Requirements", Computer Society, 31st Annual International Computer Software and Applications Conference (COMPSACT 2007), IEEE, Print ISBN: 0-7695-2870-8, 8 pages, Jul. 24-27, 2007, Beijing, China.
Alves et al., "End-to-End Formal Specification, Validation, and Verification Process: A Case Study of Space Flight Software", IEEE Systems Journal, vol. No. 7, Issue No. 4, pp. 632-641, Dec. 2013.

* cited by examiner

400

| ID | Validity - textural requirements |
|----|----------------------------------|
| R1 | The function shall set the V_Valid discrete to true if X is true and Y is true |
| R2 | The function shall set the V_Valid discrete to false if Z is false |

| ID | Validity - Logical expressions |
|----|--------------------------------|
| R1 | If X is true and Y is true then *V_Valid* shall be true |
| R2 | If Z is false, then *V_Valid* shall be false |

> //R1 the function shall set the V_Valid discrete to true if X is true and Y is true
> Requirement R1: V_Valid shall be true if X is true and Y is true.
>
> //R2 the function shall set the V_Valid discrete to false if X is false
> Requirement R2: V_Valid shall be false if Z is false.

> //R2 the function shall set the V_Valid discrete to false if Z is false
> Requirement R2: |

//R2 the function shall set the V_Valid discrete to false if Z is false.
Requirement R2:V_Valid shall be false if Z is false.

| A | B | A => B |
|---|---|--------|
| T | T | T |
| T | F | F |
| F | T | T |
| F | F | T |

FIG. 7

METHOD AND SYSTEM OF SOFTWARE SPECIFICATION MODELING

BACKGROUND

Developing a system with a software component often may involve system requirements provided by a customer. The requirements may be informally written and may express a vague idea of what the software should do. The requirements may also include business requirements, such as those from marketing, sourcing, and management. The different requirements may be written with differing levels of detail depending on, for example, the context and the available knowledge of the author. Effort may then be spent on manually reviewing and analyzing the requirements for completeness and inconsistencies. Ambiguities inherent in textual expression provided in the requirements may result in a time consuming process that includes flaws. These flaws may not be found until system verification and test phases. In some areas, the cost to fix a fault in the system test phase is 10 to 15 times more expensive than if the fault is caught early during the requirements engineering or design phases.

Therefore, it would be desirable to design an apparatus and method that provides for a quicker way to specify requirements that ensures accuracy and discovers a majority of errors earlier in the process than the system verification and test phases.

BRIEF DESCRIPTION

According to some embodiments, a specification model is generated by the application of a semantic module and a specification module. The semantic module is applied to one or more monitored and controlled variables to define the relationship there between, and then the specification module is applied to the output of the semantic module to generate the specification model.

A technical effect of some embodiments of the invention is an improved technique and system for specification model generation. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

FIG. 4 illustrates an example of system requirements allocated to software according to some embodiments.

FIG. 5 illustrates an example of selecting monitored and controlled variables according to some embodiments.

FIGS. 6A-6E illustrate a user interface according to some embodiments.

FIG. 7 is a truth table according to some embodiments.

DETAILED DESCRIPTION

Developing a system with a software component often may involve system requirements provided by a customer. The different requirements may be written with differing levels of detail depending on, for example, the context and the available knowledge of the author. Typically, effort is then spent on manually reviewing and analyzing the requirements for completeness and consistencies. Ambiguities inherent in textual expression provided in the requirements may result in flaws implemented in the software. These flaws may not be found until system verification and test phases for the software component. In some areas, the cost to fix a fault or flaw in the system test phase is 10 to 15 times more expensive than if the fault is caught early during the requirements, engineering or design phases.

Traditionally, the software development process involves a non-model based approach that begins with system requirements allocated to software, refined into high-level requirements, and then further refined into low-level requirements. In traditional non-model based approaches, the process of creating high-level requirements for a software-based system is a series of manual steps where requirements are captured in a document or a database, an engineer develops and tests a prototype to determine if the requirements are feasible and to validate that the right problem is being solved.

Some embodiments apply a model-based software development process that also begins with system requirements allocated to software, but replaces high-level requirements with a specification model, and replaces low-level requirements with a design model. In one or more embodiments, the specification model is provided by a semantic module and a specification module that have formally captured the requirements.

Some embodiments relate to safety-critical systems, and system requirements allocated to software.

Some embodiments may include the application of specification modeling via a semantic module and a specification module to formally define the software requirements ("requirements") such that the requirements are sufficiently complete and unambiguous, thereby improving the quality of requirements over traditionally captured requirements. One or more embodiments may capture the requirements using a semantic model, which is computer-readable and whose interpretation may be unambiguous, such that the risk of misunderstanding requirements is mitigated. Some embodiments may also use graphical modeling language and annotations for human-readability. One or more embodiments may output a specification model from the inputs and outputs to the semantic and specification modules. In one or more embodiments, the specification model may facilitate early analysis of requirements to prove out inconsistencies and may ensure that requirements are not in conflict, which may eliminate the problem of doing rework late in the software design process due to insufficient or incorrect requirements.

Figure 1:
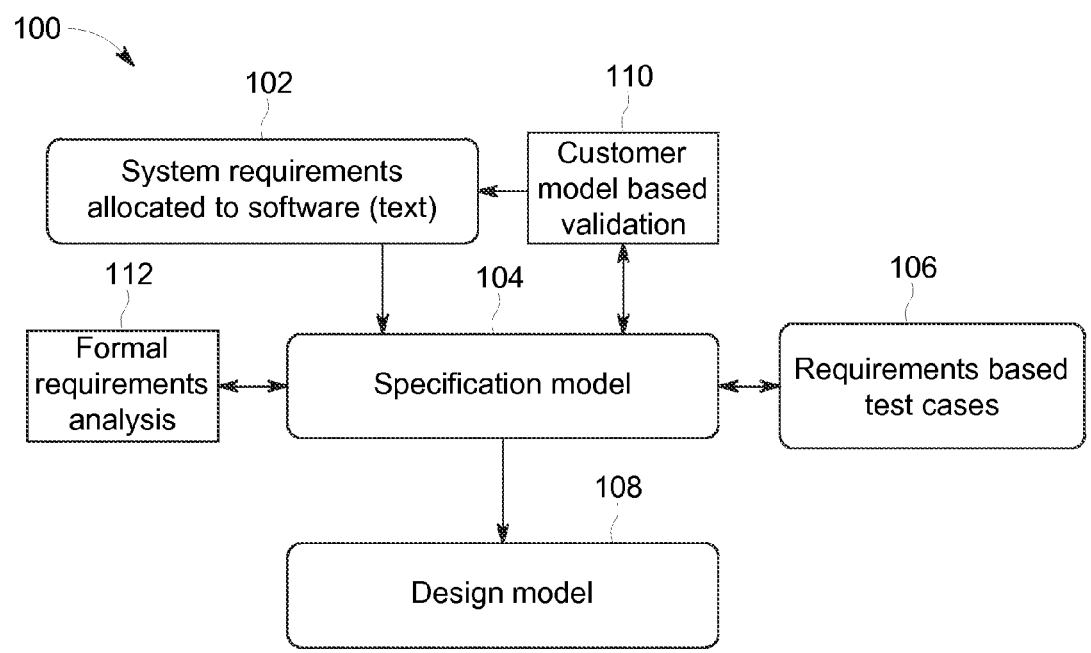
FIG. 1 illustrates a system according to some embodiments.

FIG. 1 is an example of a software development system 100, according to some embodiments. The system 100 may include system requirements 102, a specification model 104, a requirements based test case module 106, a design model 108, a customer model based validation module 110, and a formal requirements analysis module 112. As used herein, "software requirements," and "requirements" will be used interchangeably.

In some embodiments, a text version of system requirements 102 to be allocated to software are acquired. From these requirements 102, the specification model 104 is developed via a semantic module 302 (FIG. 3) and a specification module 306 (FIG. 3), using a combination of semantic modeling and graphical modeling, as described further below. In one or more embodiments, the specification model 104 may be validated with the customer via a customer validation module 110. In some embodiments, the specification model 104 may be formally analyzed and verified for correctness and consistency with a formal requirements analysis module 112 using automated theorem proving. Other suitable means of analysis and verification may be used. The formal requirements analysis module 112 may identify errors in requirements early in the software development process, which may significantly reduce late software development cycle rework, thereby saving time and money.

After the specification model 104 is validated by the customer validation module 110 and the formal requirements analysis module 112, the specification model 104 is passed as an input to a model based design team to create a design model 108. In one or more embodiments, the design model may be simulated with requirements-based test cases generated from the Specification model so that errors may be caught at the design model level.

In some embodiments, the specification model 104 may be used as an input to the requirements based automated test case generation module 106. Test cases and procedures may be automatically generated by the automated test case generation module 106, and may then be applied to the design model 108. In one or more embodiments, the test case module 106 may be used to assist an engineer to identify problematic code.

Figure 2:
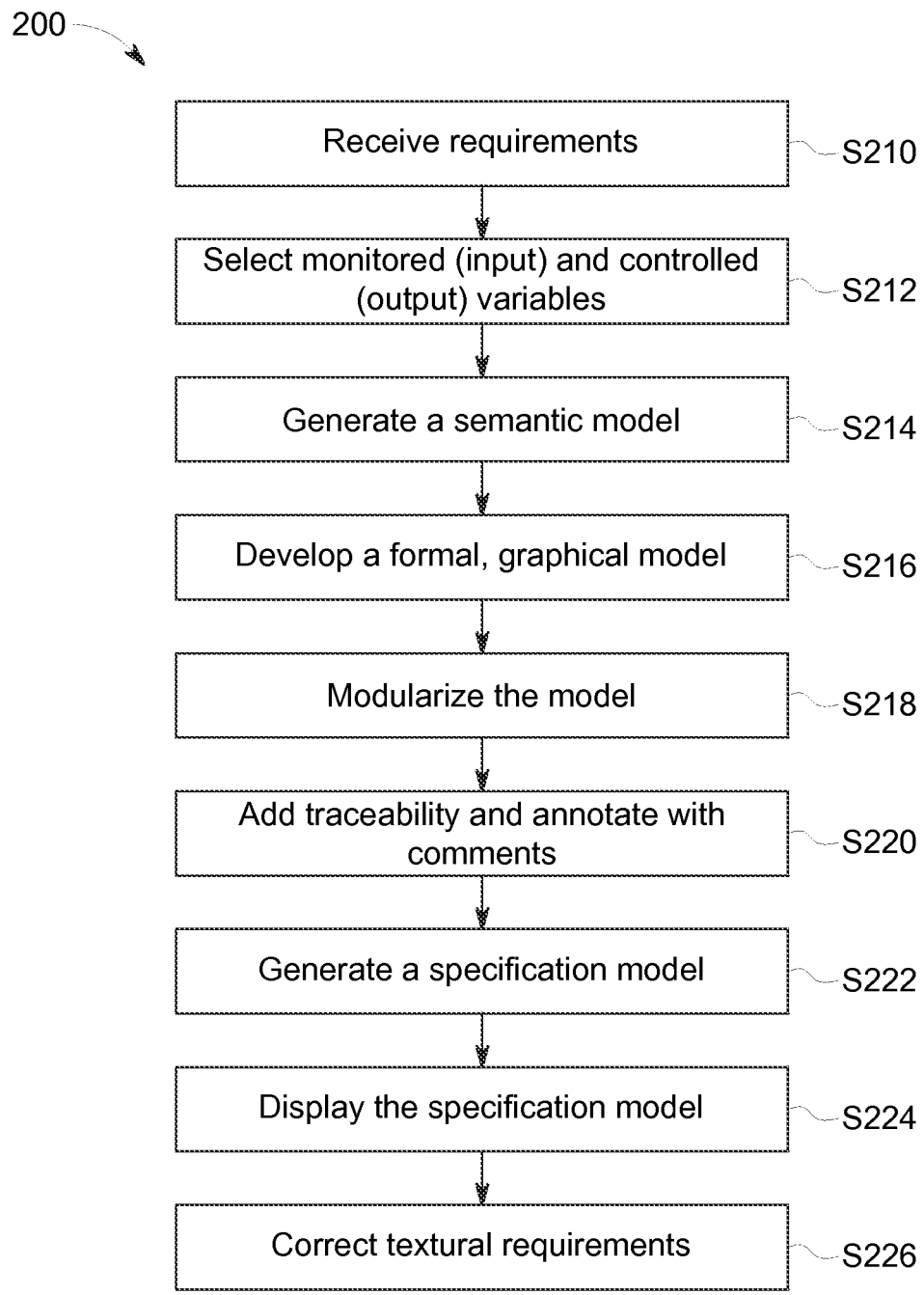
FIG. 2 illustrates a flow diagram according to some embodiments.

Turning to FIGS. 2-12, in one example of operation according to some embodiments, FIG. 2 is a flow diagram of a process 200 according to some embodiments. Process 200 and other processes described herein may be performed using any suitable combination of hardware (e.g., circuit(s)), software or manual means. In one or more embodiments, the system 100 is conditioned to perform the process 200 such that the system 100 is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to the elements of the system 100, but embodiments are not limited thereto.

Figure 3:
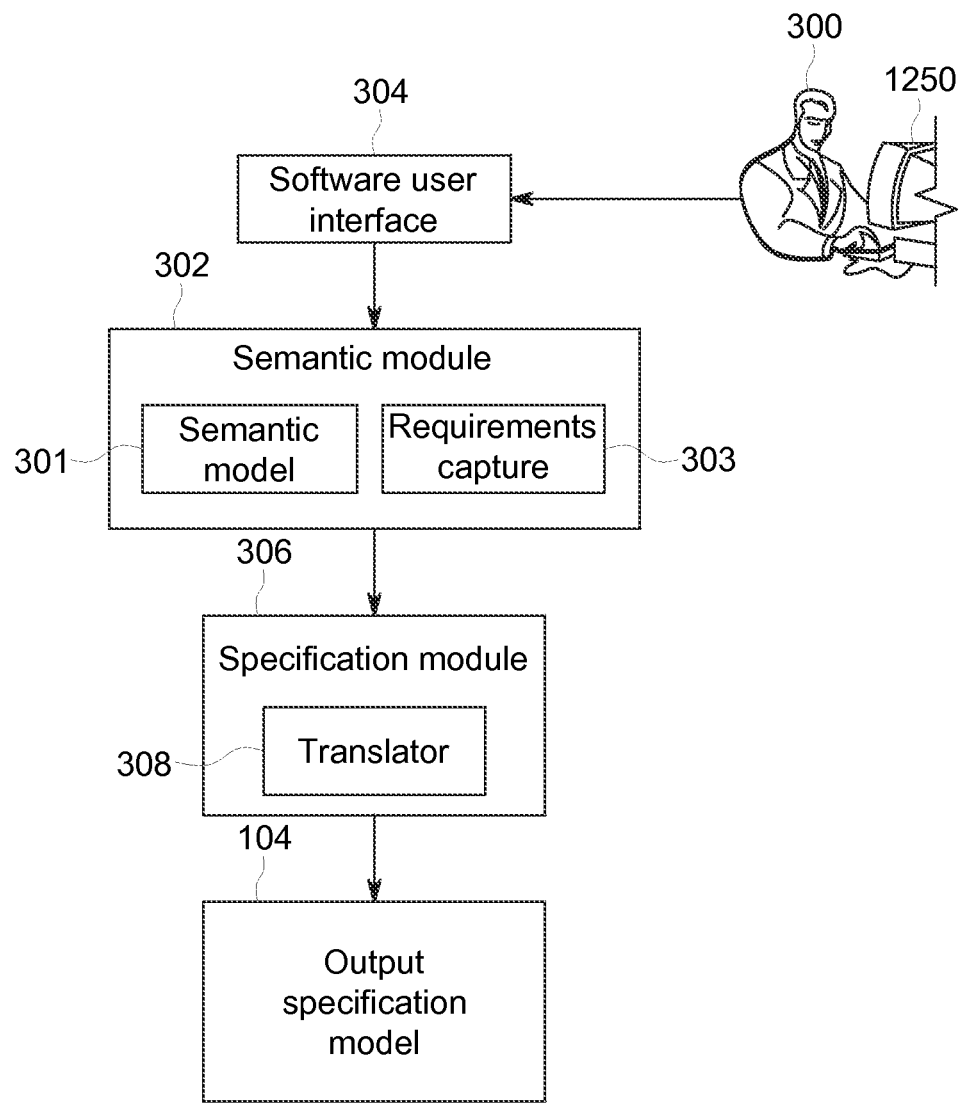
FIG. 3 illustrates a system according to some embodiments.

Initially, at S210, one or more requirements 102 are received. In some embodiments, a user 300 (FIG. 3) inputs the requirement(s) 102 to a semantic module 302 (FIG. 3) via a software user interface 304 (FIG. 3). In one or more embodiments, the requirements may be written in text.

For example, a table 400 in FIG. 4 lists two requirements 102 written in text. These requirements set the V_Valid discrete to indicate the validity of the command. This may act as a safety check in the software.

Then in S212, monitored (input) variables and controlled (output) variables are selected. In one or more embodiments, the selections are made by the user. In some embodiments, a monitored variable is a variable whose value affects the requirement, and a controlled variable is a variable whose value is set by the requirement. In some embodiments, the monitored and controlled variables may be related through the types of things which can have those properties and the relationships between those types of things.

In one or more embodiments, the requirements may be captured using semantic modeling. Semantic modeling may capture the relationship between monitored and controlled variables in the context of the system. In some embodiments, a controlled variable in one requirement may become a monitored variable in another requirement and vice versa.

Returning to S212, after the monitored (input) variables and controlled (output) variables are selected, the variables are used to formulate logical or mathematical expressions in S214 in the semantic module 302. In one or more embodiments, the logical or mathematical expressions formulated from the variables may be referred to as a "semantic model," such that the semantic module 302 generates a semantic model 301 (FIG. 3) in S214. In one or more embodiments, in these expressions, the monitored variables imply the behavior of the controlled variables. In one or more embodiments, the behavior may be implied without defining data structures for the variables, and may therefore be applied at a design stage higher/earlier than code generation. In one or more embodiments, the monitored variables implying the behavior of the controlled variables may be referred to as "declarative modeling". In one or more embodiments, the semantic module 302 may avoid the provision or suggestion of data and may avoid the control of flow among monitored and/or controlled variables such that the natural language requirements 102 captured with the semantic module 302 become logical expressions that are mathematical, and unambiguous, and in a format that is computer-readable and analyzable. As one or more embodiments avoid the provision or suggestion of data or control flow among variables, the use of a state transition machine to model system behavior and action sequences is not used, as this information is necessary for a state transition machine. Unlike traditional textual requirements, the application of the semantic model 301 in one or more embodiments is formal, repeatable, and contains consistent logical and mathematical relationships between monitored and controlled variables.

For example, keeping with the requirements shown in the Table 400 (FIG. 4), another Table 500 (FIG. 5), displays these same requirements in the form of a logical expression in an English-like syntax. The monitored (input) variables and controlled (output) variables may be identified by the semantic module 302 when formulating the logical or mathematical expressions. In one or more embodiments, the variables are selected by the user and designated and/or labeled as monitored or controlled by the user. For illustrative purposes, the monitored variables in the Table 500 are bold and the controlled variables are italic.

In one or more embodiments, semantic modeling may facilitate the capturing of requirements in English-like sentences without ambiguity. In some embodiments, the semantic module 302 may apply semantic modeling to generate the semantic model 301 and may use a limited set of English words and strict grammar and logical rules. In some embodiments, phrasing the requirements with semantic modeling may enable automation of the subsequent specification model 104 into a graphical view. It is noted that English-like sentences based on semantic modeling may be formally analyzed to check consistency of the requirements. In some embodiments, the outcome of the formal analysis may be used to suggest to engineers additional manual reviews of the requirements for corrections on inconsistencies or conflicts.

In some embodiments, the semantic model 301 generated by the semantic module 302 captures meaning of requirements by representing a) the types of things that may exist in the system under design, b) instances of things expected to exist in the system, c) the types of relationships that may exist between things in the system along with the domain and range of such relationships, d) various logical constraints upon these relationships, e.g., the type and/or number of components of a particular type that a type of system may contain, and e) specific relationships between individuals in the system, also known as the instance or scenario data. In one or more embodiments, the semantic model 301 is understandable by a computer program, and may be made more easily human readable by representation in a controlled natural language and/or in graphical renditions.

Figure 6A:
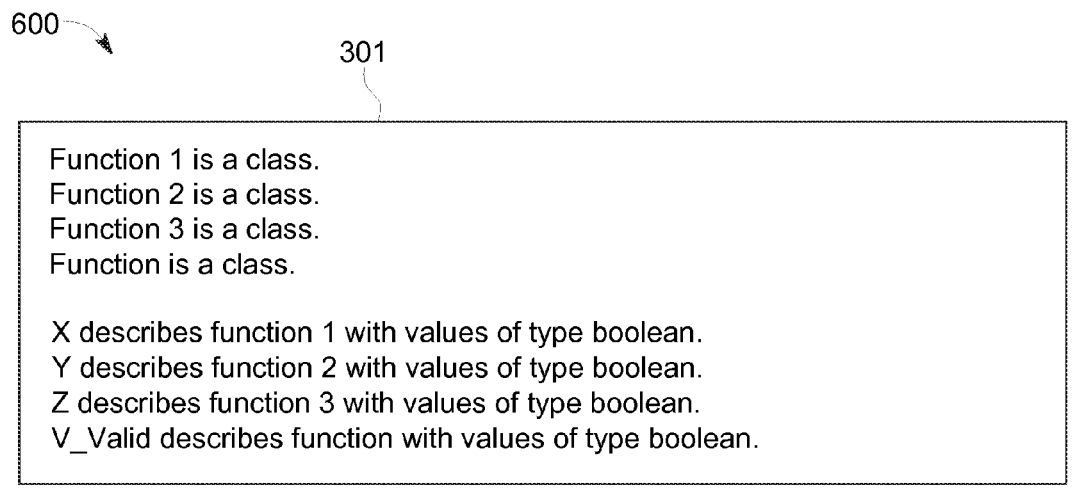

FIG. 6A provides a user interface 600 displaying the semantic model 301 of the requirements in the Table 500 in an English-like syntax with a definitive mapping to web ontology language (OWL), as further described below.

As described above, in declarative modeling, the monitored variables imply the behavior of the controlled variables. In one or more embodiments, declarative modeling paradigms include Prolog and the Description Logics family of languages, of which the Semantic Web's OWL is one. In one or more embodiments, such languages may be used to build semantic models. Other suitable languages may be used. For example, while the semantic model 301 displayed by the user interface 600 was developed using Semantic Application Design Language Integrated Development Environment (SADL-IDE), other programs may be used to develop the model. In one or more embodiments, that which is called a "variable" in requirements terminology may be called a "predicate" or "property" in semantic modeling parlance. For example, V_Valid is the controlled variable in Table 500 (FIG. 5), but is a Boolean property of the function in the semantic model.

Figure 6D:
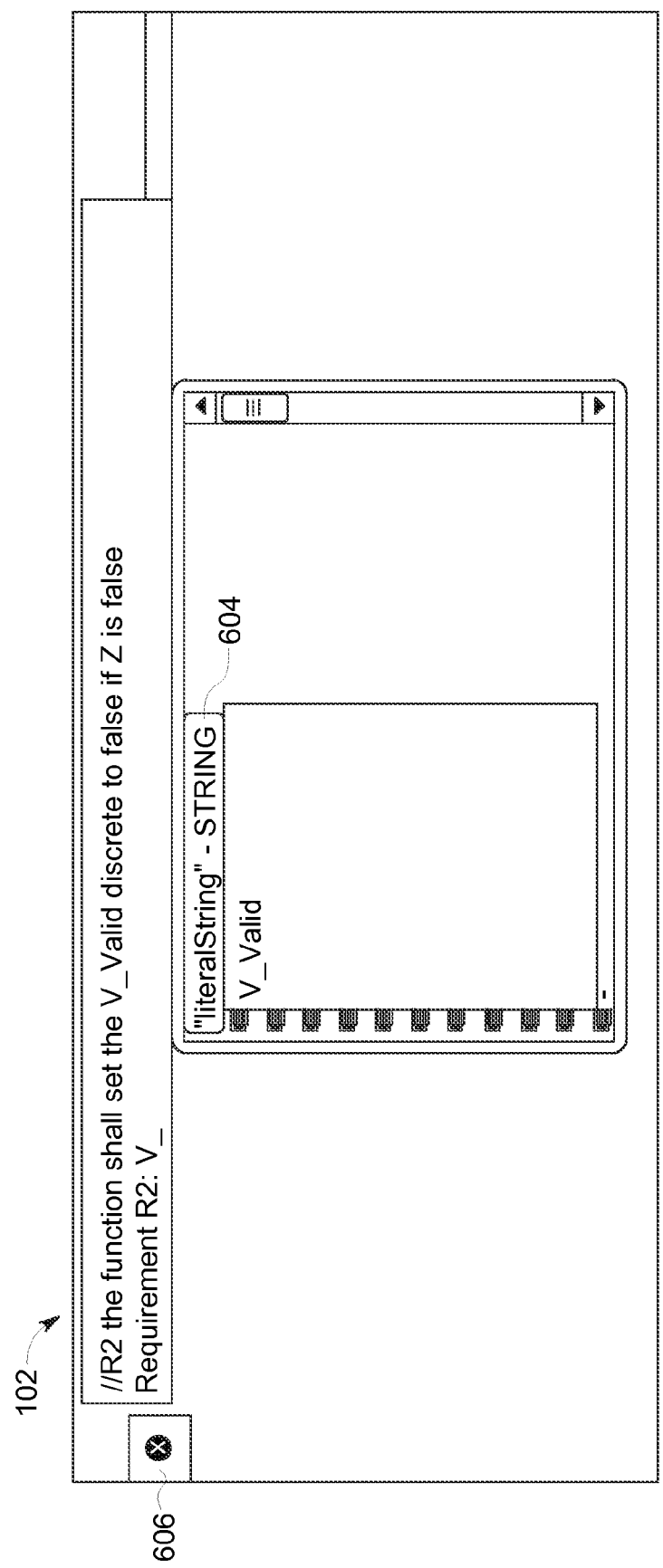
Figure 8:
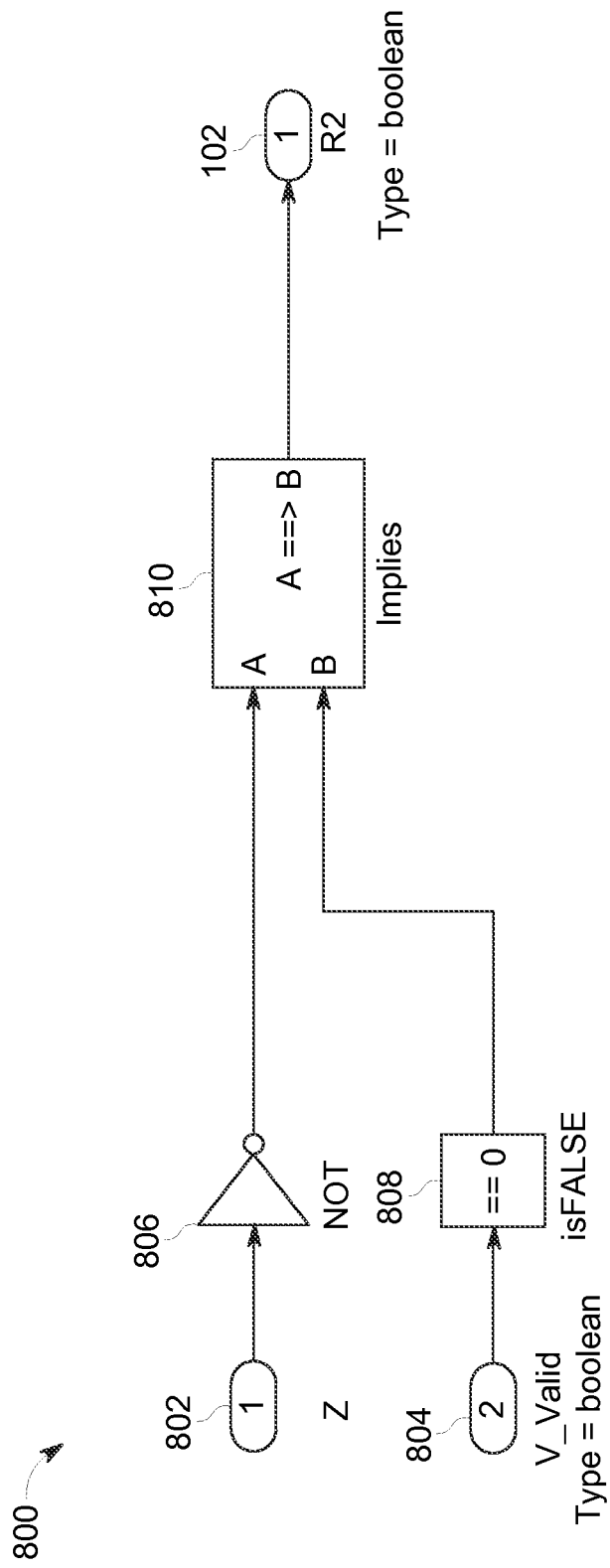
FIG. 8 illustrates a graphical model according to some embodiments.
Figure 9:
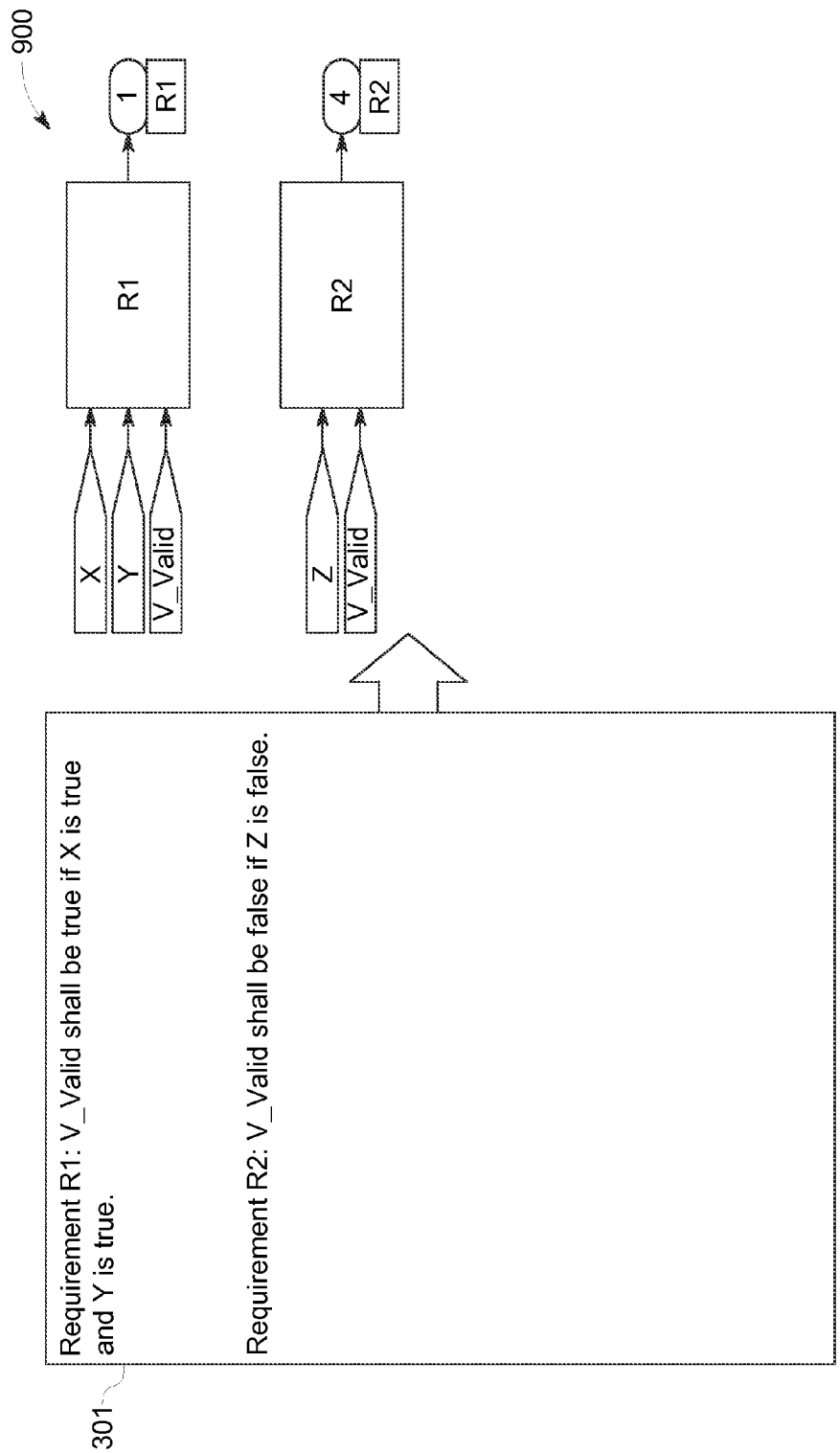
FIG. 9 illustrates a modular model according to some embodiments.

In one or more embodiments the semantic module 302 may include a requirements capture element 303. In one or more embodiments, the requirements capture element 303 may provide an interface for the user to enter the information to be included in the semantic model 301, to complete the semantic model 301. In one or more embodiments, the requirements capture element 303 may support additions of key words, such as "requirements" and "shall be," to the grammar of the semantic model 301. For example, the user interface 602 shown in FIG. 6B displays the requirements 102 shown in table 400 (FIG. 4) in a version of the requirements capture element 303 that supports the inclusion of key words such as "requirements" and "shall be" in the semantic model 301. The requirements 102 shown in FIG. 6B are a completed semantic model 301 after the requirements capture element 303 has been completed. FIG. 6C displays the application of the semantic module 302 and requirements capture element 303 to one of the requirement 102 shown in FIG. 6B, as originally written. In one or more embodiments, FIG. 6D displays the requirements capture element 303 assisting the user as the user enters the requirement by suggesting variables 604 relevant to the context of this requirement 102. FIG. 6E displays the requirement 102, as also shown in FIG. 6B. After the user types the requirement, the requirements capture element 303 of the semantic module 302 may, in one or more embodiments, confirm that the requirement conforms to the formal syntax and semantics by displaying recognized variables in color (e.g., not black), and by removing an alert marker 606 (FIG. 6D).

After the semantic model 301 is generated in S214, the semantic model 301 and requirements capture element 303 are received by the specification module 306 such that the specification module 306 may translate the requirements in the semantic model 301 (including the information added with the requirements capture element 303) to generate a formal, graphical model 800 (FIG. 8) in S216. In one or more embodiments, the graphical model 800 may be inherently computable, and may be easily human readable. In some embodiments, the specification module 306 may include a translator 308. The translator 308 may parse the monitored and controlled variables captured in the semantic model 301 (e.g., via the requirements capture element 303) and then translate and display them using differently indicated in-ports (e.g., different colors, different numbers) to indicate monitored and controlled inputs. For example, in FIG. 8-10, the graphical model 800 represents one (e.g. requirement 2) of the two requirements displayed in table 400. While only one of the two requirements is shown graphically in FIG. 8, the graphical model 800 includes all of the requirements (e.g., two in keeping with the example). In the graphical model 800 shown in FIG. 8, the monitored variable is designated by the "1" in-port 802 and the controlled variable is designated by the "2" in-port 804. The translator 308 may replace the phrase "is false" with a NOT block 806 for the monitored variable, and may replace the phrase "shall be false" with a compare block 808. An output of each of the NOT block 806 and compare block 808 may be received by an "implies" block 810. The "implies" block 810 may then output the formal model of the requirement 102, modeling the constraint that the monitored variable sets on the controlled variable. In one or more embodiments, the graphical model may be modular, traceable, and annotatable. In some embodiments, the graphical modeling language may be Simulink® by Mathworks. Simulink® uses a block diagram format, which is a rendition of the controlled natural language that is human readable, and contains a library of blocks for modeling logical expressions. Other suitable languages may be used.

In one or more embodiments, an "implies" block 810 is used in the generation of the formal, graphical model 800, as described above. The "implies" block 810 may model the logical implication and may be used to represent a constraint that a monitored variable sets on a controlled variable. FIG. 7 provides a truth table 700 associated with the "implies" block 810. Note that the logical proposition A=>B (A implies B) is true when either: (i) both A and B are true, or (ii) A is false. If A is false, then the proposition is true independently from the value of B.

Then in S218, the graphical model 800 is modularized. In one or more embodiments, the graphical model 800 may be modularized via a modularize element (not shown) associated with the specification module 306. In one or more embodiments, the blocks may be grouped into modules (also referred to herein as "subsystems"), such that all of the blocks in a particular module describe the same particular feature. Each subsystem may replace a line of requirement, making the model modular. In some embodiments, each subsystem may be named with a naming convention derived from the line of requirement that it replaces so that the name may make the diagram easily human readable. The diagram layout of the subsystems may be linear and orderly, such that related requirements may be placed next to each other. In one or more embodiments, S218 may define a modeling standard and modularize the graphical model. In some embodiments, adhering to a defined modeling standard may lead to consistency of naming conventions, diagram layouts, and allowable elements in a specification model. For example, turning to FIG. 9, a modularized model 900 is provided as flowing from the semantic model 301, also shown in FIG. 6A. The two requirements in the semantic model 301 form a single module or sub-system 900 under a general topic.

Figure 10:
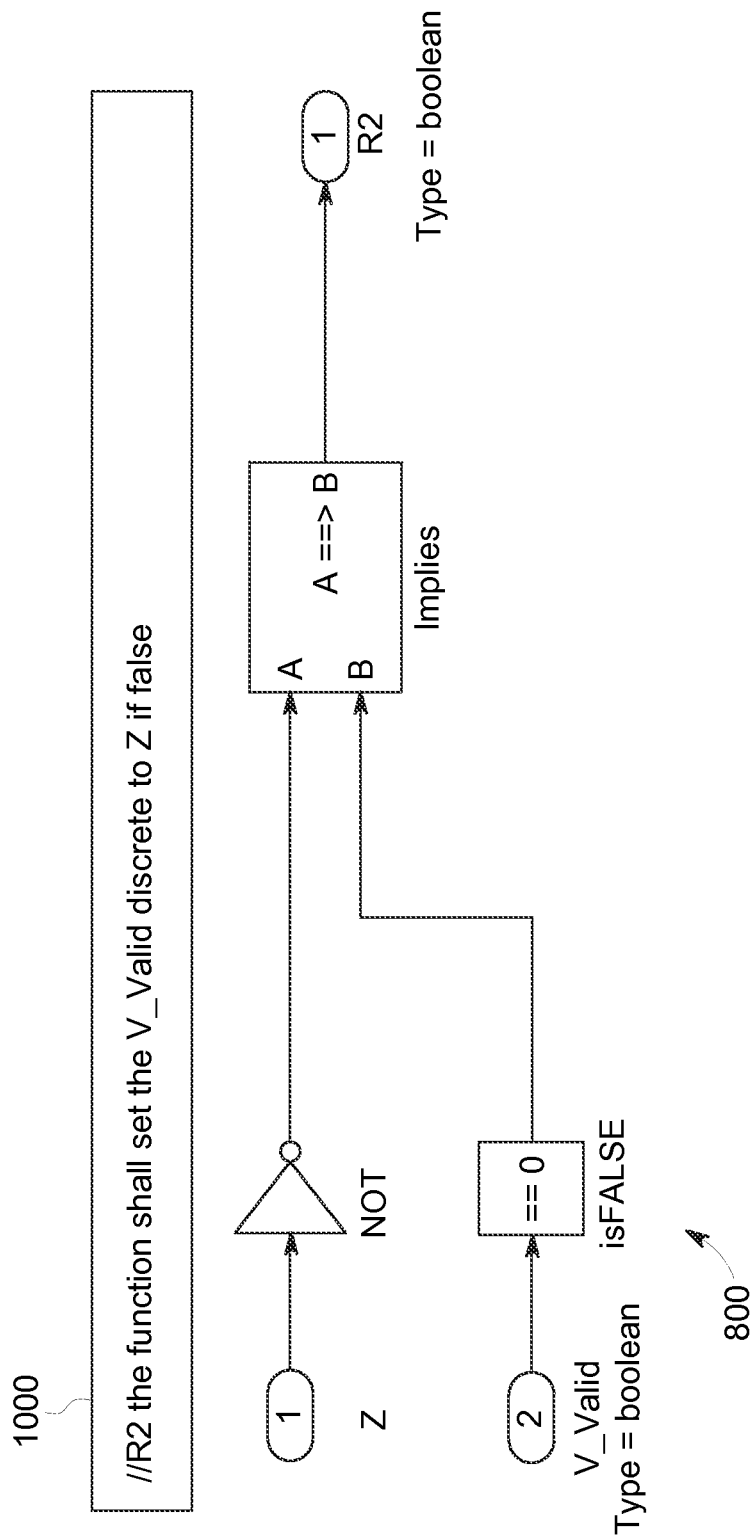
FIG. 10 illustrates a graphical model according to some embodiments.

Then in S220 the graphical model is modified, as traceability and annotations are added to the graphical model 800. In one or more embodiments, the traceability and annotations may be added to the graphical model 800 via a trace and annotate module (not shown) associated with the specification module 306. In terms of traceability, each subsystem in the graphical model 800 may be traced to a location in the design model 108 (described further below) via a hyperlink, for example, to show its relationship from requirements definition to the refinement in the design model 108. In some embodiments, as shown in FIG. 10, one or more annotations 1000 may be added to the graphical model 800. In one or more embodiments, the annotations 1000 may be comments in text boxes, such that the model 800 is human readable. Other suitable annotations may be used (e.g., freehand drawing, drawing of shapes, colors, etc.).

The specification model 104 is then generated by the specification module 306 in S222 and displayed in S224. In one or more embodiments, the specification model 104 may be the graphical model 800 including annotations and traceability, as shown in FIG. 10. In one or more embodiments, the specification model 104 formally captures the requirements and is computer-readable and human-readable, and may be used for analytics and validation. As described above, early analysis of requirements may be done with rigorous mathematical proof of the consistency, completeness and conflict-free aspect of the stated requirements. The specification model 104 may be used for requirements based test generation for software verification and artifacts for product certification.

Turning to S226, textural requirements may be corrected based on the results of a formal analysis via the Formal Requirements Analysis module 112 (e.g., from analytics). In one or more embodiments, during validation testing, a test case may be generated for each requirement. For example, validation testing may confirm that the output from the test case is the same as the output from the specification model 104 based on the same given input, and therefore the requirement is complete and validated. It is noted that by doing analytics of the requirements and validation of the requirements in the requirements capture stage, the problem of doing rework late in the software design process due to insufficient or incorrect requirements may be mitigated and/or eliminated.

In one or more embodiments, the process 200 described above may generate the specification model 104 using less steps. For example, after the semantic model 301 is generated in S214, the process continues to generate a specification model in S222, without the generation of a graphical model (S216-S220). The process may then continue as described above with respect to FIG. 2. As another example, after the monitored and controlled variables for the requirements are selected in S212, a graphical model is developed, as in S216, without the generation of a semantic model (S214). In this embodiment, a user may replace the translator 308, and may manually parse and label the monitored and controlled variables. The process may then continue as described above with respect to FIG. 2.

Figure 11:
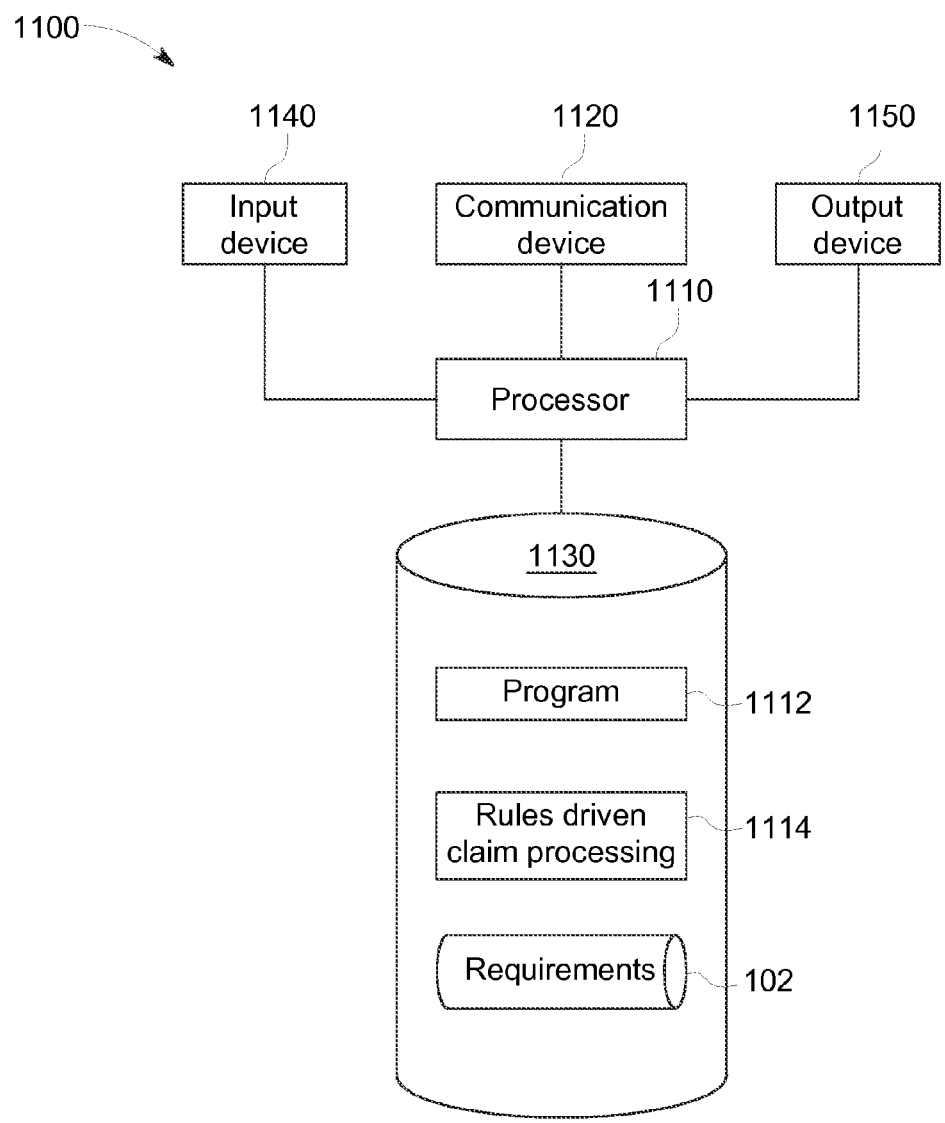
FIG. 11 is a block diagram of a specification model processing tool or platform according to some embodiments.

Note the embodiments described herein may be implemented using any number of different hardware configurations. For example, FIG. 11 illustrates a specification model processing platform 1100 that may be, for example, associated with the system 100 of FIG. 1. The specification model processing platform 1100 comprises a specification model platform processor 1110, such as one or more commercially available Central Processing Units (CPUs) in the form of one-chip microprocessors, coupled to a communication device 1120 configured to communicate via a communication network (not shown in FIG. 11). The communication device 1120 may be used to communicate, for example, with one or more users. The specification model platform 1100 further includes an input device 1140 (e.g., a mouse and/or keyboard to enter information about variables, clustering and optimization) and an output device 1150 (e.g., to output and display the selected samples).

The processor 1110 also communicates with a memory/storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 may store a program 1112 and/or specification model processing logic 1114 for controlling the processor 1110. The processor 1110 performs instructions of the programs 1112, 1114, and thereby operates in accordance with any of the embodiments described herein. For example, the processor 1110 may receive written requirements 102 and then may apply the semantic module 302 and then the specification module 306 via the instructions of the programs 1112, 1114 to generate a specification model 104.

The programs 1112, 1114 may be stored in a compressed, uncompiled and/or encrypted format. The programs 1112, 1114 may furthermore include other program elements, such as an operating system, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a semantic module and a specification module. The method steps can then be carried out using the distinct software modules and/or sub-modules of the system, as described above, executing on one or more hardware processors 1110 (FIG. 11). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A system comprising:
a communication device configured to receive data associated with a set of requirements for a software design;
a semantic module configured to store the set of requirements and transform set of requirements into a semantic model;
a specification module configured to store the semantic model, translate the semantic model and generate a graphical model for presentation via a display, wherein the graphical model presents different requirements from the set of requirements as different visual representations via the display;
wherein the specification module is further configured to receive at least one monitored and at least one controlled variable, parse monitored and controlled variables and then translate and display them using differently indicated in-ports to indicate monitored and controlled inputs, wherein differently indicated in-ports include different numbers or different colors or combinations thereof;
a memory for storing program instructions;
at least one specification model platform processor, coupled to the memory, and in communication with the specification module and the semantic module and operative to execute program instructions to:
transform the set of requirements into the semantic model by executing the semantic module;
translate one or more phrases in the semantic model into one or more blocks representing logical expressions in the graphical model by executing a translator of the specification module; and
modify the graphical model to generate a specification model by executing the specification module, wherein the specification model is human-readable and computer-readable for use in the software design.

2. The system of claim 1, wherein the semantic module is configured to receive at least one monitored variable and at least one controlled variable and wherein the at least one monitored variable is a variable whose value affects the requirement, and the at least one controlled variable is a variable whose value is set by the requirement.

3. The system of claim 2, wherein the at least one monitored variable implies behavior of the at least one controlled variable.

4. The system of claim 2, wherein the semantic module is configured to capture a relationship between the at least one monitored variable and the at least one controlled variable with respect to a semantic modeling system.

5. The system of claim 2, wherein the semantic module is configured to formulate at least one of a logical expression and a mathematical expression from the at least one monitored variable and the at least one controlled variable.

6. The system of claim 5, wherein the specification module is configured to integrate the at least one of the logical expression and the mathematical expression into the graphical model.

7. The system of claim 6, wherein the specification module is configured to group similar graphical elements from the graphical model into one or more sub-systems to form a modularized specification model.

8. The system of claim 1, wherein the data associated with the set of requirements comprises textual data indicative of written text.

9. The system of claim 1, wherein the graphical model includes one or more annotations in human-readable text.

10. The system of claim 1, wherein the specification model is formally analyzed and verified using automated theorem proving.

11. The system of claim 1 further comprising a requirement capture element to allow addition of key words to a grammar of the semantic model, wherein key words include "requirements" or "shall be" or combinations thereof.

12. The system of claim 11, wherein the specification module generates the graphical model based on the information from the requirement capture element.

13. The system of claim 1, wherein the graphical model is modular, traceable and annotatable.

14. A method comprising:
receiving requirements for a software design;
selecting a monitored variable associated with the requirements and a controlled variable associated with the requirements for input to a semantic module;
transforming the requirements into a semantic model by executing the semantic module, wherein the semantic model defines a relationship between the monitored variable and controlled variable;
translating one or more phrases in the semantic model into one or more blocks representing logical expressions in a graphical model by executing a translator of a specification module, comprising displaying a first requirement from the requirements as a first graphical element via the graphical model and displaying a second requirement from the requirements as a second graphical element via the graphical model; and modifying the graphical model by executing the specification module to generate a specification model that is human-readable and computer-readable for use in the software design;

wherein the method further includes parsing the monitored variable and the controlled variable and then translating and displaying them using differently indicated in-ports to indicate monitored and controlled inputs, wherein differently indicated in-ports include different numbers or different colors or combinations thereof.

15. The method of claim 14, further comprising:
formulating at least one of a logical expression and a mathematical expression with the semantic module to generate the semantic model.

16. The method of claim 15, further comprising:
generating the graphical model with the specification module based on the semantic model.

17. The method of claim 14, further comprising:
grouping similar graphical elements of the graphical model into one or more sub-systems to form a modularized specification model with the specification module.

18. The method of claim 16, further comprising:
annotating the graphical model with human-readable text via the specification module.

19. The method of claim 14, further comprising providing a system, wherein the system comprises distinct software modules, each of the distinct software modules being embodied on a computer-readable storage medium, and wherein the distinct software modules comprise the semantic module and the specification module;
wherein:
defining the relationship between the monitored variable and the controlled variable is carried out by the semantic module executing on at least one hardware processor; and
generation of the specification model is carried out by the specification module executing on the at least one hardware processor.

20. A non-transitory, computer-readable medium storing instructions that, when executed by a computer processor, cause the computer processor to perform a method associated with specification model generation, the method comprising:
receiving a set of requirements associated with a software design;
selecting at least one monitored variable and at least one controlled variable for input to a semantic module;
transforming the set of requirements into a semantic model by executing the semantic module, wherein the semantic model defines a relationship between the at least one monitored variable and the at least one controlled variable;
translating one or more phrases in the semantic model into one or more blocks representing logical expressions in graphical model by executing a translator of a specification module, comprising displaying, via the graphical model, a portion of the set of requirements as a visual representation and another portion of the set of requirements as another visual representation; and
modifying the graphical model by executing the specification module to generate a specification model that is human-readable and computer-readable for use in the software design;
wherein the method further includes parsing the monitored variable and the controlled variable and then translating and displaying them using differently indicated in-ports to indicate monitored and controlled inputs, wherein differently indicated in-ports include different numbers or different colors or combinations thereof.

21. The medium of claim 20, wherein the at least one monitored variable implies behavior of the at least one controlled variable.

22. The medium of claim 20, wherein the set of requirements comprises textual data.

23. A system comprising:
a communication device configured to receive data associated with a set of requirements for a software design;
a semantic module configured to store the set of requirements and transform the set of requirements into a semantic model, wherein the semantic model represents instances of things expected to exist in the system, the types of relationships that exist between the things in the system, the domain of the relationships and the range of the relationships;
a specification module configured to store the semantic model, translate the semantic model and generate a graphical model for presentation via a display, wherein the graphical model presents different requirements from the set of requirements as different visual representations via the display;
wherein the specification module is further configured to receive at least one monitored and at least one controlled variable, parse monitored and controlled variables and then translate and display them using differently indicated in-ports to indicate monitored and controlled inputs, wherein differently indicated in-ports include different numbers or different colors or combinations thereof;
a memory for storing program instructions;
at least one specification model platform processor, coupled to the memory, and in communication with the specification module and the semantic module and operative to execute program instructions to:
transform the set of requirements into the semantic model by executing the semantic module;
translate the semantic model into the graphical model by executing the specification module; and
modify the graphical model to generate a specification model by executing the specification module, wherein the specification model is human-readable and computer-readable for use in the software design.

* * * * *